(12) United States Patent  (10) Patent No.: US 9,046,201 B1
Theis                      (45) Date of Patent:     Jun. 2, 2015

(54) HIGH PRESSURE HIGHLY FLEXIBLE, STABLE IN LENGTH, THERMOPLASTIC HOSE AND METHOD OF MAKING THE SAME

(71) Applicant: Schieffer Co. International L.C., Peosta, IA (US)

(72) Inventor: Jeffrey D. Theis, Dubuque, IA (US)

(73) Assignee: Schieffer Co. International L.C., Peosta, IA (US)

( * ) Notice: Subject to any disclaimer, the term of this patent is extended or adjusted under 35 U.S.C. 154(b) by 82 days.

(21) Appl. No.: 13/733,680

(22) Filed: Jan. 3, 2013

Related U.S. Application Data

(60) Provisional application No. 61/583,023, filed on Jan. 4, 2012.

(51) Int. Cl.
*F16L 11/00* (2006.01)
*F16L 11/02* (2006.01)

(52) U.S. Cl.
CPC .................................... *F16L 11/02* (2013.01)

(58) Field of Classification Search
CPC ....... F16L 11/08; F16L 11/082; F16L 11/085; F16L 11/086; B29D 23/001; B29K 2021/00; B29K 2105/06
USPC .......................................... 138/123–126, 172
See application file for complete search history.

(56) References Cited

U.S. PATENT DOCUMENTS

| | | | | |
|---|---|---|---|---|
| 1,455,359 A | * | 5/1923 | Schulthess | 138/126 |
| 2,788,804 A | * | 4/1957 | Larkin | 138/125 |
| 3,022,802 A | * | 2/1962 | Lewis | 138/125 |
| 3,062,241 A | | 11/1962 | Brumbach | |
| 3,116,760 A | | 1/1964 | Matthews | |
| 3,481,368 A | * | 12/1969 | Linger et al. | 138/125 |
| 3,682,201 A | * | 8/1972 | Atwell et al. | 138/125 |
| 3,725,167 A | * | 4/1973 | Love et al. | 156/143 |
| 3,861,973 A | | 1/1975 | Koch | |
| 3,866,631 A | | 2/1975 | Chudgar | |
| 3,914,146 A | | 10/1975 | Koch | |
| 3,944,453 A | | 3/1976 | Chudgar et al. | |
| 4,111,237 A | * | 9/1978 | Mutzner et al. | 138/125 |
| 4,341,578 A | | 7/1982 | Chermak et al. | |
| 4,383,554 A | * | 5/1983 | Merriman | 138/101 |
| 4,952,262 A | | 8/1990 | Washkewicz et al. | |
| 5,330,807 A | * | 7/1994 | Williams | 428/34.5 |
| 5,380,571 A | | 1/1995 | Ozawa et al. | |
| 5,964,409 A | | 10/1999 | Alexander et al. | |
| 6,199,594 B1 | | 3/2001 | Mezzalira | |
| 6,679,298 B2 | * | 1/2004 | Espinasse | 138/172 |
| 6,978,805 B2 | | 12/2005 | D'Amico | |
| 7,021,339 B2 | * | 4/2006 | Hagiwara et al. | 138/123 |
| 7,222,644 B2 | | 5/2007 | Pianetto et al. | |

(Continued)

FOREIGN PATENT DOCUMENTS

WO    WO/2009/040610    4/2009

*Primary Examiner* — Frederick C Nicolas
(74) *Attorney, Agent, or Firm* — James C. Nemmers; Shuttleworth & Ingersoll, PLC

(57) ABSTRACT

The invention is an improved high pressure hose used for hydraulic actuation and fluid conveyance of various liquid media under relatively high pressure. The hose has an inner tube of an elastomeric material that provides a fluid-carrying passageway. The inner tube is covered with a layer of braided yarn and a layer of textile yarn extending parallel to the axis of the fluid-carrying passageway, with an outer sheath of a thermoplastic material completing the hose.

17 Claims, 2 Drawing Sheets

(56) References Cited

U.S. PATENT DOCUMENTS

| | | |
|---|---|---|
| 2004/0096615 A1 * | 5/2004 | Manas-Zloczower et al. .............. 428/36.9 |
| 2009/0169784 A1 | 7/2009 | Mezzalira |
| 2009/0205736 A1 | 8/2009 | Mezzalira |
| 2010/0052317 A1 | 3/2010 | Mezzalira |
| 2012/0238428 A1 * | 9/2012 | Dalmolen et al. ............ 493/299 |

* cited by examiner

HIGH PRESSURE HIGHLY FLEXIBLE, STABLE IN LENGTH, THERMOPLASTIC HOSE AND METHOD OF MAKING THE SAME

The present application claims priority to provisional patent application 61/583,023 which was filed on Jan. 4, 2012, and is hereby expressly incorporated by reference.

BACKGROUND

Wire and textile reinforced high pressure elastomeric and thermoplastic hoses are well known for applications of hydraulic actuation and closed or open loop conveyance. Closed loop fluid conveyance refers to applications where the medium that passes through the hose is not released. One example of closed loop conveyance might be for heat transfer or dissipation or for cooling. Open loop conveyance refers to applications where a controlled amount of medium is released, for example, high pressure spray applications. As used herein the term "rubber" is synonymous with "elastomer" and refers to thermosetting, crosslinking, or curable materials, including natural and synthetic rubbers such as, but not limited to Neoprene®, nitrile, Buna N, styrenebutadiene rubber (SBR), Hypalon™, silicone and the like. Modern elastomeric materials are often devised of more than one rubber material and may contain other additives and/or be comprised of additional elements such as one or more thermoplastic constituent(s). The term "thermoplastic" means materials which are solid at room temperature and which soften at an elevated temperature repeatedly. Some examples, but by no means all that may apply to this invention, include thermoplastic materials such as nylon, polyester terephthalate, polyethylene, polyvinyl chloride, polyamide (nylon), ethylene vinyl acetate, polypropylene and polyurethane. Modern thermoplastic materials are often devised of more than one thermoplastic materials and may contain other additives and/or be comprised of additional elements such as one or more elastomeric or rubber constituent(s).

High pressure, thermoplastic yarn-reinforced hoses have been in existence for more than 50 years. In the early days of the product, there were no defined standards. Currently, the Society of Automotive Engineers (SAE) has adopted detailed standards that specify the base materials used in the stated hose types in order to meet the standards. The standards include materials, construction, dimensional tolerances and the dynamic test parameters for a wide range of hose types and sizes. Such details are amply described in the standards identified as SAE J343 and SAE J517.

Within these standards there are two main types of high pressure hoses described. One type is a rubber or elastomeric hose reinforced with braided or spiral layers of high tensile strength material, usually steel wire. Another type is a thermoplastic hose that is reinforced with textile yarn. For the purposes of the present invention, the specification pertaining to thermoplastic hose that is reinforced with textile yarn will be referenced. Specific and different types within that category are further defined within the standards SAE 100R7, 100R8 and 100R18.

The United States Patent of Brumbach, U.S. Pat. No. 3,062,241 discloses a plastic tube comprised of Nylon (Polyamide 11) plastic tubing over which is applied at least one layer of reinforcing fiber and an outer sheath of nylon. Said materials are very strong, but known to be problematic in the application as they are very stiff. Because of the stiffness of the nylon, this makes the final hose subject to flattening and kinking at a relatively small bend radius. In particular, this weakens the hose, and after repeated kinking the plastic becomes creased. Said creasing is defined as notch sensitivity to those familiar with the art, and said notch may eventually cause the inner tube or cover to rupture. Such a rupture will result in a potentially dangerous high pressure leak.

The United States Patent of Matthews, U.S. Pat. No. 3,116,760 discloses attempts to rectify the kinking issue by recommending the use of a highly flexible polyurethane inner tube and cover material and bonding the various layers with a heat and chemical process to form a lamination. These processes are expensive and dangerous as the use of high heat and solvent based adhesives are known to create toxicity and present a hazard to workers and the environment. Secondly, the concept requires that such process and machinery be duplicated on every reinforcing machine. This is not feasible, as one tube making line is able to support as many as about 20 yarn reinforcement machines. Lastly, while the embodiments described within Matthews certainly achieved a better kink resistance and higher degree of flexibility, no mention is made of the tendency for the hose to elongate when pressure equal to the specified working pressure is applied. For those familiar with the art, such elongation is known to occur with soft and highly flexible materials, even if fully or partially laminated.

Neither Brumbach nor Matthews teach about the change in length phenomena. SAE J517 and other standards reference a change in length maximum of plus or minus 3%. Change in length is often referred to as elongation. It simply means that when the hose is pressurized to the maximum specified working pressure, longitudinal forces can cause the hose to stretch or shrink. This shrinking or elongation can occur for a number of reasons, including elasticity of the inner tube material, braid reinforcement angle, yarn denier, yarn tensile strength, tension at which the yarn is applied, type of bonding and other reasons well known to those familiar with the art.

Hose braiding requires the intersecting of multiple strands of multifilament yarn which run in uniform opposite helical directions. To those familiar with the art, the ideal is a braid angle that is neutral. Such a neutral braid angle will result in a stable hose that will not change in length when pressurized. However, there are circumstances that can negatively influence the ideal. For example, when very soft materials are used, the longitudinal forces can cause the inner tube to stretch and the actual braid angle to narrow or reduce. For illustrative purposes, in an extreme example, the angle might change from 90° to 70°. Such change in angle results in a longer overall hose structure. It further redistributes and reduces the thickness of the yarn layer. Lastly, it moves the intersections of the yarn further apart longitudinally from each other. All three phenomena can dramatically reduce the burst pressure performance of the hose to below the desired minimum safety factor.

A further deleterious effect of elongation is that the hose stretches. If the hose is in a fixed position, it will move as it elongates. As the hose is pulsed by frequent changes in pressure, the result is a hose that is in constant movement. In the case of a tight installation, such movement can bring the cover into contact with surfaces that will abrade and damage the hose.

It is important to note that the terms "change in length and elongation" are not limited to only an increased length. Elongation can result in a positive increase in length or a negative change in length. In the case of a decrease in length, in a fixed application, the hose is shrinking. This can result in the hose pulling out of a connector or other fitting prematurely and without warning.

Additionally, it is well known to those familiar with the art, that the change in length of a particular hose is a very good indicator of impulse life. In the case of the SAE J517, the impulse test conditions are defined under which the hose must perform to at least 100,000 and as many as 300,000 impulses. For example a ¼" ID hose produced to the SAE 100R18 standard, must withstand at least 200,000 impulses at nearly 4,000 PSI whereby the hose is pressurized and relaxed within various specified environmental controls. More preferably, hoses will perform to a higher level than the minimum defined in the standards for impulse. Most preferably, 1,000,000 impulses or more will be achieved. Change in length above 3% will dramatically reduce the life of the hose as the internal components are literally pulling against each other to separate, such separation will result in internal abrasion of the yarn, tube and material that will accelerate the hose failure at fewer than the standard impulse designation.

Change in length can be influenced and to some extent brought under control by several methods. One way can be by using tube or cover sheath materials that are very stiff. As in the case of Brumbach, the example of Polyamide (Nylon 11) is one example of such a material. However, the trade off is a finished hose structure that is also stiff, difficult to handle and prone to flattening, kinking and crimping. While such a concept could be acceptable in a fixed hydraulic application, for example on an agricultural tractor, a high degree of flexibility is desirous for an open loop spray type applications, two of which might be high pressure cleaning and airless paint spraying.

Matthews teaches that softer materials can be used, if the hose is somehow mechanically bonded to the inner tube and cover sheath. However, such bonding processes and materials have historically been very complex, expensive, toxic to workers and the environment and they achieve only limited results. As claimed by Matthews, the concept applies only to one nominal size of hose. The present invention would apply not only to more than one size of hose, but the principles can be applied to all nominal sizes as stated within the standards as well as additional fractional sizes as needed.

In fluid conveyance applications, hose storage reels or drums are frequently utilized where the hose is wound and stored on a reel or otherwise coiled against itself. In such applications, elongation of even 3% is not desirable. Such movement creates friction and thus heat and can result in eventual fusing or welding of one wound section to another, affecting a permanent joining of the parallel structures. This is particularly prone to occur when using preferred soft, tacky or elastic materials which contribute to the overall flexibility of the hose. This phenomenon can be addressed by using abrasion resistant additives or materials of a lower degree of elasticity. The prior solution is not economically acceptable and the latter solution stiffens the hose.

Other patents, for example United States Patent of Chudgar, U.S. Pat. No. 3,866,631, United States Patent of Koch U.S. Pat. No. 3,861,973 and United States Patent of Koch U.S. Pat. No. 3,914,146 and United States Patent of Chudgar, U.S. Pat. No. 3,944,453, build upon the idea of complex, expensive and often toxic methods resulting in lamination of nylon or polyester core tubes. None of these patents provide any teaching about elongation.

United States Patent of Ozawa, U.S. Pat. No. 5,380,571, does not teach bonding or lamination but does teach the incorporation of vulcanized rubber particles with thermoplastic and provides a well defined means of measuring flexural rigidity. However, the hose is produced by extruding over a mandrel, which adds at least three expensive steps to the normal thermoplastic hose production process. Further, there is no teaching about elongation in Ozawa.

United States Patent of Alexander, U.S. Pat. No. 5,964,409, teaches only one particular size of hose and claims elongation of no more than 3% at 25% of minimum burst pressure.

Therefore, an object of the invention is a high pressure thermoplastic hose that when kinked resists crimping and returns to its original shape.

A further object of the present invention is to produce a high strength high pressure textile reinforced thermoplastic hose that is very stable in length at up to 33% of the minimum designated burst pressure with or without chemical bonding between the layers.

A further object of the present invention is the method of using a highly economical, three stage process for variations of a braided hose that imparts all the benefits of high flexibility, small bend radii and length stability while being perfectly suitable for hydraulics, open or closed loop conveyance, and a electrically static dissipating hose suitable for conveyance of materials like solvent based paint and for use where outside environment is prone to explosion due to static electricity.

A further object is an economical method of producing a high strength highly flexible high pressure textile reinforced thermoplastic hose that is suitable for open or closed loop hydraulic applications.

Yet another object of the present invention is a method of manufacturing that stabilizes soft materials during the hose making process by using parallel strands of multifilament high tenacity yarn longitudinally and parallely applied during the reinforcement or braiding process.

A still further object of the present invention is a method of producing a very economical high strength highly flexible high pressure textile reinforced conductive and static dissipating high pressure hose suitable for spraying flammable materials or in flammable environments.

SUMMARY OF THE INVENTION

The invention provides an improved high pressure hose used for hydraulic actuation and fluid conveyance of various liquid media under relatively high pressure. The hose has an inner tube of an elastomeric material that provides a fluid-carrying passageway. The inner tube is covered with a layer of braided yarn and a layer of textile yarns the strands of which extend parallel to the axis of the fluid-carrying passageway. An outer sheath of a thermoplastic material completes the hose. There may be more than one each of the two reinforcing layers of braided or parallel yarns, which layers may be alternating between the inner tube and outer sheath.

DETAILED DESCRIPTION OF THE PREFERRED EMBODIMENTS OF THE INVENTION

Figure 1:
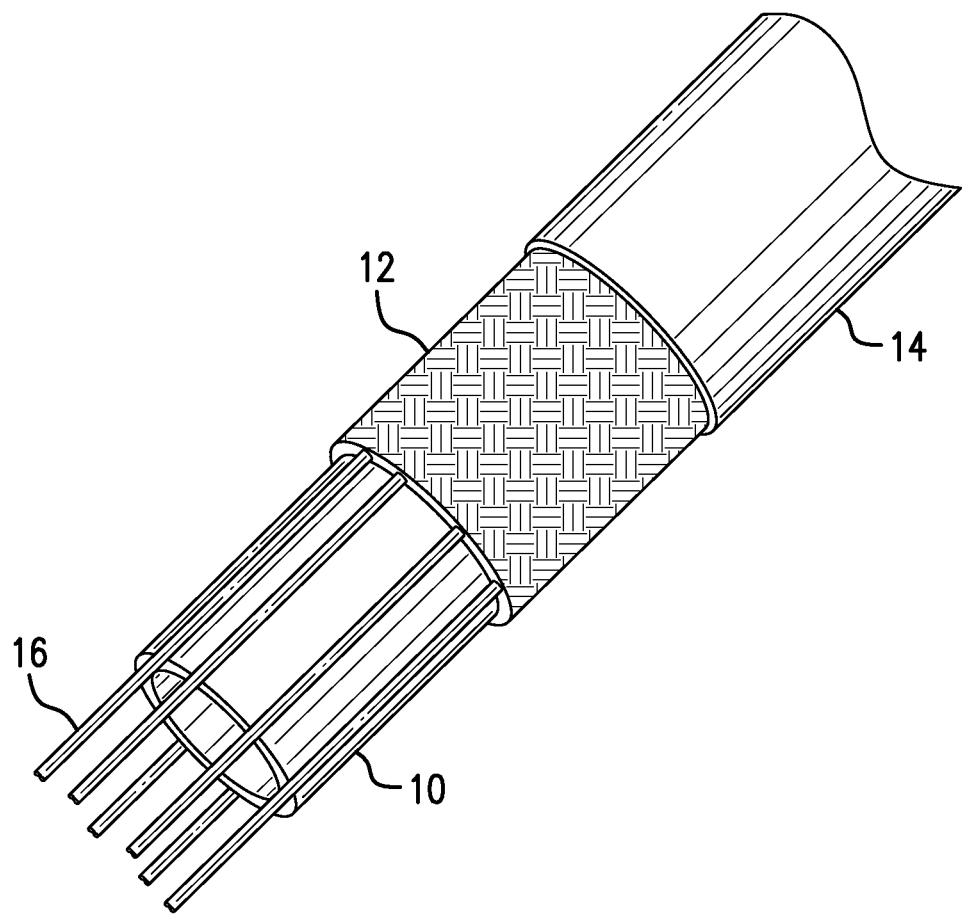
FIG. 1 is a perspective view of a hose constructed according to the principles of the invention, with layers removed to better illustrate the invention.

The instant invention provides a high strength high pressure textile reinforced thermoplastic hose having a very small bend radius, and a high degree of flattening and kink resistance. Referring first to FIG. 1, a hose constructed according to the invention is a high pressure highly flexible hose that is very stable in length. Said hose is comprised of a highly flexible, thermoplastic composite inner tube 10, reinforced with one or more layers of braided or spiralized high tenacity textile yarn 12 and covered with a highly flexible thermoplastic sheath 14. As more fully described hereinafter, Incorporated underneath, between or on top of said reinforcement layer(s) 12 is one or more strands of high tenacity multifilament textile yarn that forms a layer 16. The yarns of layer 16 run parallel to the axis of the inner tube 10 and outer sheath 14. Incorporated underneath, between or on top of the inner tube 10, reinforcement layer 12 or parallel yarn layer 16 may be an adhesive that chemically bonds or laminates the structure.

The methods of manufacturing high pressure thermoplastic hoses are well known to those familiar with the art. Within SAE J517 and SAE J343 documents there are described three main types of high pressure yarn reinforced thermoplastic hose standards: SAE 100R7, SAE 100R8 and SAE 100R18. The major distinction between the types has to do with varying burst pressures, impulse life, etc. The present invention will apply, but is not limited to, all three types.

As the prior art has disclosed, early examples of thermoplastic hose utilized semi-rigid thermoplastic materials such as Nylon which is very stiff and subject to kinking. Later examples disclosed in the prior art demonstrate complicated means of laminating various layers. Some results were better than others, but until the present invention, a suitable and economical hose along with an economical method of manufacture has not been available to the market. The methods disclosed in the prior art are consistent in that they generally follow three main steps. First, a tube of thermoplastic material is extruded. In a second, separate step, high tenacity yarn reinforcement is braided or otherwise applied. In the third and final step, a thermoplastic cover is extruded over the top of the yarn reinforcement. In order to achieve some form of stability, a partial or full lamination was often employed. Thus, between the first and second steps, and between the second and third steps, complicated means of adhesive, chemical bond or a thermal bond is often accomplished. In some cases, these were completely new steps that were not done continuously or simultaneously.

In Ozawa U.S. Pat. No. 5,380,571, the hose is produced by using a mandrel for the inner tube which adds two distinct and separate and expensive stages. The hose of the present invention contemplates only three steps.

The hoses referenced in the other prior art patents cited above were conceived of primarily for hydraulic applications. As previously stated, in many hydraulic actuation applications, a change in length of plus or minus 3% in overall length is considered acceptable. However, elongation of even 3% is not desirous particularly in fluid conveyance applications where hose reels are frequently utilized and hose is wound and stored on said reel. When a hose is pressurized it can grow or shrink in length. When depressurized or when the pressure is reduced to a lower level, the hose attempts to relax and go back to its original length. Such movement causes friction, heat and eventual fusing or welding of one wound section to another, effecting a permanent joining of the parallel structures.

With rigid or semi-rigid materials used for the inner tube, there is a natural resistance to change in length. However, as hose makers pursued thermoplastic with rubber like flexibility, hose designers attempted to incorporate softer materials, which are inherently more prone to stretching. When such hose types are pressurized, the softer materials naturally stretched. The reinforcement applied in the form of braiding moves like a scissors when a hose is stretched. Such change in length is not only unacceptable for spray hoses, they are also not desirous for hydraulic hoses. When a hose is stretched and become longer, it moves the reinforcement coverage area, the reinforcement amount and the angle of the yarn.

The present invention also teaches specific novel methods to enhance the manufacturing process and provides a novel resulting hose in terms of performance. These methods will now be described.

Figure 2:
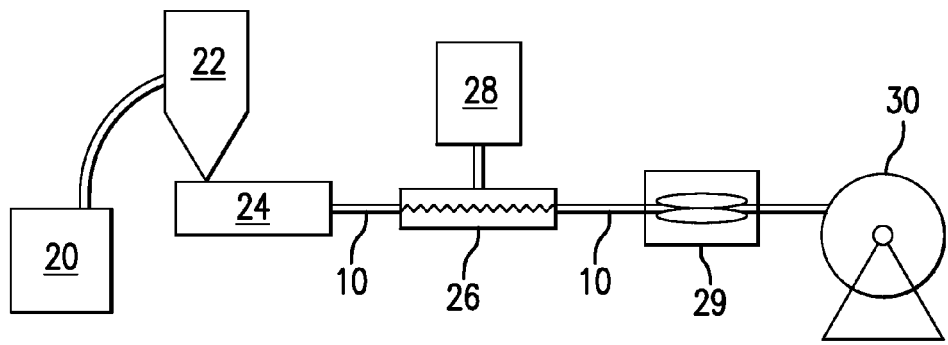
FIG. 2 is a block diagram of the first station of making hose according to the invention, the first phase being formation of the inner tube.

In a preferred embodiment of the method of the invention, and referring first to FIG. 2 showing the first station of the process, plastic pellets of one or more suitable materials, such as highly flexible thermoplastic co-polyester, are fed from a container 20 into a hopper 22 and from there into an extrusion machine 24 to form the inner tube 10. The inner tube 10 may be comprised of one or more thermoplastic materials mixed or otherwise dispersed in one layer or coextruded in one or more layers. Said combinations of more than one material may be desirable to accomplish different degrees of chemical resistance, electrical conductivity, flexibility, heat resistance or other properties. The inner tube 10 is then passed through a cooling tank 26 which is being fed a liquid coolant from a chiller 28. The inner tube 10 is then pulled by a puller 29 from the cooling tank 26 and taken up onto a reel or drum 30. In one embodiment, the inner tube 10 thus formed preferably has a nominal 6.4 mm ID with about a 1.0 mm wall thickness.

Figure 3:
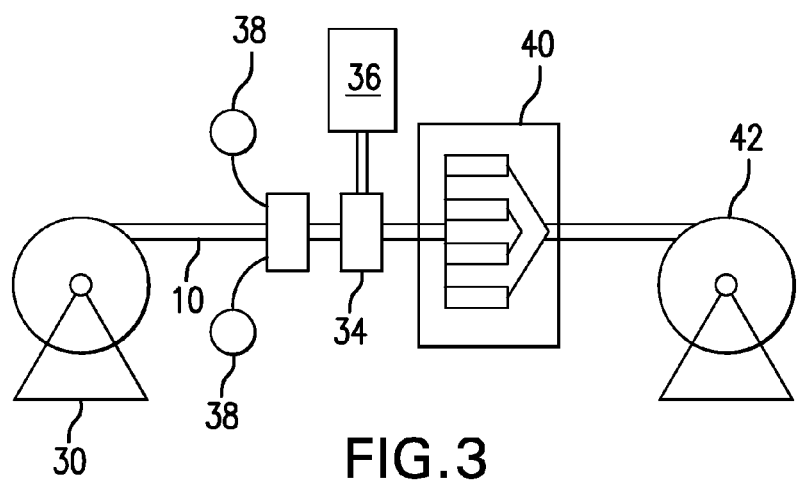
FIG. 3 is a block diagram of the second station of making hose according to the invention, the second station being application of the reinforcing layer.

The drum 30 is moved to the next station illustrated in FIG. 3. The inner tube 10 is fed from the drum 30 into a glue applicator and wiping device 34 fed by a pump 36. Applicator 34 applies a thin layer of polyurethane adhesive to the outside of the inner tube 10. Longitudinal yarn applicator spools 38 are positioned equidistant from each other to apply strands of multifilament high tenacity polyester yarn to form layer 16, which is formed on the outside of the inner tube 10 directly beneath a layer of multifilament high tenacity polyester reinforcement yarns 12 which are simultaneously applied by a braiding machine 40 by conventional means. This reinforcing layer 12 covers the inner tube 10, the adhesive layer and the parallel strands that form layer 16 after which the adhesive material is allowed to cure and then the reinforced tube is wound onto a drum 42.

Figure 4:
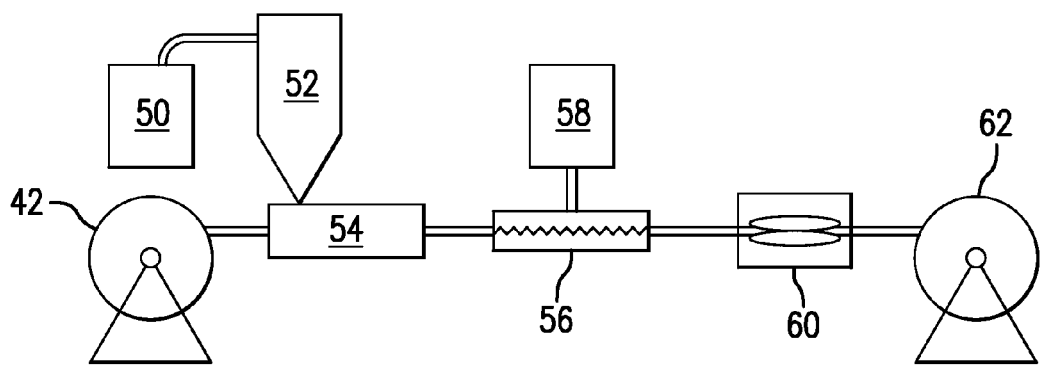
FIG. 4 is a block diagram of the final station of making hose according to the invention, the final station being application of the cover or outer sheath.

The final stage of the process is illustrated in FIG. 4. A container 50 containing pellets of a thermoplastic material suitable for the sheath 14 are fed into a hopper/dryer 52 and then into an extrusion machine 54. The braided and reinforced tube is taken off the drum 42 and passed through the extrusion head machine 54 where the thermoplastic outer sheath 14 is extruded over the reinforced hose. The covered hose is then passed through a cooling tank 56 being fed with liquid coolant from a chiller 58. The now cooled hose is pulled from the cooling tank 56 by a puller 60, and the finished hose is again taken up on a drum 62.

The layer 16 of parallel yarn strands support the entire reinforced tube structure so that when the hose is pressurized, the longitudinal forces are controlled so as to restrict elongation. The yarns forming the layer 16 may be treated or untreated and can vary by material, denier, filaments per strand, position and quantity. The strands of layer 16 may, but do not have to be, the same as the material used in the braided reinforcement layer 12. However, they are always applied in an amount sufficient to reduce the change in length of the hose from about zero to about plus or minus 1.5%.

It should be understood that in a hose for a particular application, the number of strands 16 will vary, sometimes being four strands, sometime more and sometimes fewer.

Also, it should be understood that in a hose for a particular application, there may be more than one layer of the strands 16, especially if there is a second reinforcing layer 12, in which case there may be a first reinforcing layer 12, a first layer of strands 16, a second reinforcing layer 12 and then a second layer of strands 16. Or there may be two reinforcing layers 12 with a single layer of strands 16 between them.

Variation of the above described method may be used in conjunction with the yarns forming the layer 16, including the application of adhesive between various layers, but in the case of the preceding embodiment of the present invention, the parallel yarns forming layer 16 are a major contributing and limiting factor in elongation. As stated previously, the yarns forming 16 may be applied on the inner tube 10 inside of the first layer of textile braiding reinforcement layer 12, between layers or on the outside of the reinforcement layer 12 between the reinforcement layer 12 and thermoplastic sheath 14.

Surprisingly, it has been discovered that in addition to the superior technical performance, the parallel strands of layer 16 add a significant stability to the cover sheath extrusion process. The extrusion process relies on a machine 60 that pulls the reinforced tube off the drum 42, through the extrusion head of machine 54 where the outer sheath 14 of thermoplastic is applied. Such pulling is done under tension by the puller 60. Due to the presence of heat used in this process and the high degree of elasticity of the base tube 10 and the material that forms cover sheath 14, the hose structure tends to pulse as it is pulled through the extrusion head 54 by puller 60. Such tension is especially difficult to control as higher tension tends to reduce the hose diameter by stretching which allow the hose to pull through the extrusion die faster. Correspondingly, the hose can come out of dimensional tolerance which can dramatically affect the dynamic and safety performance of the hose. In the case of the present invention, with the parallel strands of layer 16 in place, the stretching is eliminated or to a large degree controlled. Thus, a very consistent, dimensionally stable hose is produced using highly flexible elastic materials.

Additionally, in this case, the hose of the invention was measured against kinking or crimping using both the methods of determining kinking as taught by the patents to Matthews and Alexander, and the hose easily passed to a dimension well below 38 mm.

Surprisingly, the novel method of extrusion of the invention with the parallel yarns of layer 16 positioned longitudinally in the direction of the hose travel, the high tenacity of the yarn does not allow the structure to elongate as it is pulled during processing. Said stability allows for a relatively high but uniform tension while maintaining consistent and relatively high speed. The result is that the hose is produced to very close dimensional tolerances. Said tolerances assure no effect of dynamic performance as previously described herein.

United States Patent of D'Amico, U.S. Pat. No. 6,978,805 teaches a high pressure thermoplastic hose with a flexible thermoplastic inner tube, a braided yarn reinforcement layer with several electrically conductive yarns braided within the structure over which a flexible thermoplastic sheath is extruded. This concept is problematic in that the electrically conductive yarns are not commercially available with the same tensile strength as those commonly used to reinforce thermoplastic hose. This creates problems with the braiding processes as the different types of yarn will respond to controlled tension of the braiding process. Secondly, the electrically conductive yarn is very expensive and as it is braided at a helix, the amount of yarn consumed in such a process is at least double what it would be if it were simply placed parallel to the longitudinal direction of the tube as per the present invention. Again, the novelty of the present invention results in an economic advantage relative to the known prior art.

The method of the invention described above can be varied in another embodiment of the method of the invention. The first stage can be where the inner tube 10 is formed in a continuous simultaneous co-extrusion which means two materials are extruded at the same time. The materials are fused together to form one solid lamination of two layers that comprise the inner tube 10. In this case a semi-rigid nylon material is extruded to a thickness of about 0.15 mm upon which a layer of highly flexible polyurethane is applied to a thickness of about 0.85 mm. The finished inner tube 10 has a nominal 6.4 mm ID with about a 1.0 mm wall thickness. The nylon and polyurethane co-extruded tubes are subsequently cross linked or otherwise mechanically fused together to permanently form one homogenous structure for the inner tube 10. The nylon material used on the inside of the tube is selected for high degree of chemical resistance. However, the polyurethane used on the outside of the tube is selected because of a high degree of flexibility. Continuously, as the last part of the first stage of extrusion, the inner tube 10 is taken up onto a hose reel or drum 30 as in the first embodiment.

The drum 30 containing the inner tube 10 can be used immediately or at a later date where it is moved to the second station of FIG. 3 where the process continues by paying out the inner tube 10 from the drum 30. As in the first embodiment, continuously, a thin layer of highly flexible polyurethane adhesive is applied by means of an applicator and wiping device 34 to the outside of the inner tube 10 as it is taken off the drum 30. Simultaneously, strands of electrically conductive multifilament high tenacity yarn that form layer 16 are positioned longitudinally parallel with the direction of the inner tube 10 equidistant from each other over the outside of the inner tube 10. Simultaneously, a reinforcing layer 12 of multifilament high tenacity polyester reinforcement is applied by a braiding machine 40 by conventional means. Said reinforcement layer 12 covers the inner tube 10, the adhesive layer and the parallel strands that form layer 16 after which the adhesive material is allowed to cure. Continuously, as the last part of the second stage of reinforcement, the modified tube is taken up onto a hose reel or drum 42.

In the third and final stage similar to the first embodiment shown in FIG. 4, the now braided inner tube 10 is paid out from the drum 42 and passed through an extrusion machine 54 where a thermoplastic outer sheath 14 is applied and cooled. The hose is then again taken up on a drum 62.

In yet another embodiment of the hose and method of the present invention, the parallel yarn strands that form layer 16 are made of a material that is electrically conductive so as to serve two functions. First, they support the entire reinforced tube structure so that when the hose is pressurized the longitudinal forces are controlled so as to restrict the elongation phenomena previously described. However, as a novel aspect of the present invention, in this particular case, the parallel strands that form layer 16 are conductive in nature, and if properly terminated with electrically conductive end fittings (not shown) this structure will provide a static drain to ground. Such yarns may be treated with metal or carbon to be conductive or untreated conductive yarn and can vary by material, denier, filaments per strand, position and quantity. The strands that form layer 16 may, but do not have to be, the same basic material used in the braided reinforcement layer 12. However, they are always applied in an amount sufficient to reduce the change in length of the highly flexible hose from about zero to about plus or minus 1.5%.

Static dissipation has a wide range of applications where the hose of the present invention has advantages. One is in the use of the hose for high pressure airless paint sprayers. Underwriters Laboratories Standard 1450 mandates the specific methods required to dissipate the static charge. Under specific conditions, such a charge could cause a spark and ignite highly volatile fumes or atomized flammable droplets of solvents commonly used in paint. The present invention is a most economical solution for hoses used in such an application.

Other applications for a static dissipating hose would be where high concentrations of flammable dust might be present. This might include, for example, cabinet shops and grain handling depots, but use of the hose of the invention is not limited in scope. In these cases and others, the static dissipative hose of the invention can be used to drive hydraulic motors. Because of internal exposure to electricity, unless specially and expensively insulated, induction motors may not be suitable due to explosion risk. The one embodiment of the present invention provides for dissipation of the static electricity that might be generated by the travel of liquid through hose, thereby eliminating an explosion risk when connected to a totally enclosed hydraulic motor.

Additionally, hoses of this embodiment, when measured against kinking or crimping using the measurement techniques taught by Matthews and Alexander, will easily perform to a dimension well below 38 mm.

In yet another embodiment of the invention, the first stage is to form the inner tube 10 in a continuous extrusion process from a mixture of highly flexible PVC and NBR rubber. The finished inner tube 10 has a nominal 6.4 mm ID with about a 1.0 mm wall thickness. As in the first embodiment of the method shown in FIG. 2, after completion of the stage of extrusion at the first station, the inner tube 10 is taken up onto a hose reel or drum 30.

The drum 30 can be used immediately or at a later date where it is moved to the second station where the process begins by paying out the tubing from the drum 30. Unlike previous embodiments, there is no adhesive layer. As the tubing is payed out from the drum 30, strands of multifilament high tenacity yarn to form layer 16 are positioned equidistant from each other and longitudinally parallel with the axis of the inner tube 10 over the outside of the inner tube 10. Simultaneously, a layer of multifilament high tenacity polyester reinforcement 12 is applied by a braiding machine 40 by conventional means. Said reinforcement layer 12 covers the inner tube 10 and the parallel strands of layer 16, and, as the last part of the second stage of reinforcement, the modified tube is taken up onto a hose reel or drum 42.

In the third and final stage similar to the first embodiment of FIG. 4, the braided inner tube 10 is taken up from the drum 42 then passed through an extrusion machine 54 where a thermoplastic outer sheath 14 is applied. In this embodiment, various printing characters are applied to the hose for identification purposes and the now finished hose is again taken up on a drum 62.

Additionally, hoses of this described embodiment, when measured against kinking or crimping using the measurement techniques taught by Matthews and Alexander, will easily perform to a dimension well below 38 mm. In fact, in addition to the nominal 6 mm hose, three other hose sizes were produced to the following nominal sizes resulting in the following burst pressures, bend radius and flexural rigidity:

| Nom. ID | Min. Burst | Bend Radius* | Flexural Rigidity** | Elongation (at 33% of burst) |
| --- | --- | --- | --- | --- |
| 5 mm | 11,000 PSI | 20/25 mm | 2.9 Lbs. | 1.2% |
| 6 mm | 10,000 PSI | 25/31 mm | 3.0 Lbs | 1.5% |
| 8 mm | 11,000 PSI | 28/35 mm | 3.8 Lbs. | 1.4% |
| 10 mm | 12,000 PSI | 30/38 mm | 4.0 Lbs. | 1.3% |

*Bend radius without kinking measured using methods for kinking of finished hose as taught in Matthews and Alexander, respectively
**Flexural rigidity using methods taught in Matthews and Ozawa, respectively In the case of higher burst pressures, it is known by those familiar with the art how to modify hoses to withstand increased pressure. In the case of all three previously described embodiments, all hoses described within SAE100R7, 100R8 and 100R18 will see kinking, elongation and bend radius results far more desirable than those noted within the standards and the known prior art.

The yarn or yarns used as the parallel axis layer may be multifilament yarns of same, similar or dissimilar materials. They may be the same or vary from the material or materials used in the braiding and the same may be true of other parallel strands.

The present invention is not limited by the embodiments or examples described herein. The terms and expressions which have been used are used as terms of description and not of limitation and there is no intention in the use of such terms and expressions of excluding any equivalents of any of the features described, or portions thereof, but it is recognized that various modifications are possible within the scope of the invention.

What is claimed is as follows:

1. A high pressure, highly flexible, stable in length hose comprising:
   an inner tube comprised of a highly flexible thermoplastic material and having an outer surface and an inner surface that defines a fluid-carrying passageway having a longitudinal axis;
   an outer sheath of a highly flexible thermoplastic material covering the inner tube;
   a first layer of reinforcing material between the inner tube and outer sheath; and
   a second layer of reinforcing material, the second layer comprised only of strands of textile yarn extending parallel to the axis of the fluid-carrying passageway, the strands of textile yarn comprising the second layer being separate from the first layer to form the second layer between the inner tube and outer sheath.

2. The high pressure hose of claim 1 in which the first layer of reinforcing material is a layer of braided or spiralized textile yarn.

3. The high pressure hose of claim 1 in which there is more than one second layer of reinforcing material separate from the other layers and comprised only of strands of textile yarn between the inner tube and outer sheath, the strands of yarn of each second layer extending parallel to the axis of the fluid-carrying passageway.

4. The high pressure hose of claim 1 in which there are two first layers of reinforcing material between the inner tube and outer sheath, and the second layer of reinforcing material extends between and is separate from the two first layers.

5. The high pressure hose of claim 1 in which there is more than one first layer of reinforcing material and more than one second layer of reinforcing material of strands of textile yarn between the inner tube and outer sheath, the first and second layers alternating between themselves and being separate from the other layers.

6. The high pressure hose of claim 1 in which hose meets the standard of SAE 100R7, SAE 100R8 and SAE 100R18.

7. The high pressure hose of claim 1 having a nominal ID of about 5 mm with a minimum burst pressure of greater than about 11,000 PSI and a bend radius of less than about 20/25 mm.

8. The high pressure hose of claim 7 in which the flexural rigidity is less than about 2.9 lbs and the elongation at 33% burst pressure is less than about 1.2%.

9. The high pressure hose of claim 1 having a nominal ID of about 6 mm with a minimum burst pressure of greater than about 10,000 PSI and a bend radius of less than about 25/31 mm.

10. The high pressure hose of claim 9 in which the flexural rigidity is less than about 3.0 lbs and the elongation at 33% burst pressure is less than about 1.5%.

11. The high pressure hose of claim 1 having a nominal ID of about 8 mm with a minimum burst pressure of greater than about 11,000 PSI and a bend radius of less than about 28/35 mm.

12. The high pressure hose of claim 11 in which the flexural rigidity is less than about 3.8 lbs and the elongation at 33% burst pressure is less than about 1.4%.

13. The high pressure hose of claim 1 having a nominal ID of about 10 mm with a minimum burst pressure of greater than about 12,000 PSI and a bend radius of less than about 30/38 mm.

14. The high pressure hose of claim 11 in which the flexural rigidity is less than about 4.0 lbs and the elongation at 33% burst pressure is less than about 1.3%.

15. The high pressure hose of claim 1 in which the second layer of reinforcing material is comprised of strands of yarn that are electrically conductive.

16. The high pressure hose of claim 1 in which the inner tube is comprised of a mixture of thermoplastic and elastomers that process as a thermoplastic.

17. The high pressure hose of claim 1 in which the inner tube is comprised of two individual layers of rubber and thermoplastic material.

* * * * *